(12) United States Patent
Zahirovic et al.

(10) Patent No.: US 9,757,703 B2
(45) Date of Patent: Sep. 12, 2017

(54) MULTI-BED REACTOR WITH MIXING DEVICE

(71) Applicant: Haldor Topsøe A/S, Kgs. Lyngby (DK)

(72) Inventors: Emir Zahirovic, Copenhagen NV (DK); Klaus Risbjerg Jarlkov, Hårlev (DK); Louise Jivan Shah, Vedbæk (DK); Jacob Brix, Rødovre (DK); Michael Boe, Klampenborg (DK); Olav Holm-Christensen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 202 days.

(21) Appl. No.: 14/812,484

(22) Filed: Jul. 29, 2015

(65) Prior Publication Data

US 2015/0328610 A1    Nov. 19, 2015

Related U.S. Application Data

(63) Continuation of application No. PCT/EP2014/051908, filed on Jan. 31, 2014.

(51) Int. Cl.
*B01J 8/04* (2006.01)
*C10G 49/00* (2006.01)
*B01F 5/04* (2006.01)
*B01F 3/04* (2006.01)
*C10G 65/00* (2006.01)
*C10G 65/02* (2006.01)

(52) U.S. Cl.
CPC ......... *B01J 8/0492* (2013.01); *B01F 3/04985* (2013.01); *B01F 5/0413* (2013.01); *B01J 8/0453* (2013.01); *C10G 49/002* (2013.01); *C10G 65/00* (2013.01); *C10G 65/02* (2013.01); *B01J 2208/00849* (2013.01); *B01J 2208/00929* (2013.01)

(58) Field of Classification Search
CPC ................... B01J 8/0453; B01J 8/0492; B01J 2208/00849; B01J 2208/00929; B01J 2208/00938
See application file for complete search history.

(56) References Cited

U.S. PATENT DOCUMENTS

| | | | | |
|---|---|---|---|---|
| 3,480,407 | A * | 11/1969 | Anderson | B01J 8/0005 261/113 |
| 7,674,439 | B2 * | 3/2010 | Jacobs | B01D 3/20 261/114.2 |
| 8,017,095 | B2 | 9/2011 | Kemoun et al. | |
| 2012/0241006 | A1 | 9/2012 | Chen et al. | |
| 2013/0064740 | A1 * | 3/2013 | Boyak | B01F 3/04113 422/600 |

FOREIGN PATENT DOCUMENTS

WO    WO 96/34683 A1    11/1996

* cited by examiner

*Primary Examiner* — Lessanework Seifu
(74) *Attorney, Agent, or Firm* — Blank Rome LLP

(57) ABSTRACT

A mixing device mounted between two catalyst beds in a multi-bed catalytic reactor with a cylindrical shape. The mixing device has a circular outer rim which corresponds to the inner wall of the reactor, and includes a collecting section for collecting fluid from an up-stream catalytic bed, a mixing section for mixing the collected fluid, and a discharging section for discharging the mixed fluid to a down-stream catalytic bed. The collecting section, the mixing section and the discharging section are disposed outside the center of the circular cross-section of the reactor.

13 Claims, 9 Drawing Sheets

US 9,757,703 B2

MULTI-BED REACTOR WITH MIXING DEVICE

This is a continuation of International Application No. PCT/EP2014/051908, filed Jan. 31, 2014, which claims priority to International Application Nos. PCT/EP2013/052222, filed Feb. 5, 2013 and PCT/EP2013/061505, filed Jun. 4, 2013, the disclosures of which are herein incorporated by reference in their entireties.

FIELD OF THE INVENTION

This invention relates to a reactor comprising a mixing device, specifically a multi-bed hydroprocessing reactor. Specifically, the mixing device is for use in down-flow catalytic reactors which include vertically superimposed packed beds of particulate catalytic material wherein a liquid, liquid and gas mixture or vapor is processed as it flows down through the packed beds. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC).

BACKGROUND OF THE INVENTION

Hydrocracking is a process for converting of heavy oil fractions to light oil fractions. Hydroprocessing is taking place in a hydroprocessing catalytic reactor which is the key element of a hydroprocessing unit. Hydroprocessing catalytic reactors can have single or multiple catalyst beds. Which of the options will be chosen for a particular reactor depends on the amount of catalyst is required for conversion of the feed to the product with desired properties. Most of the hydroprocessing reactions are exothermic and heat is developed as feed is passing through the catalyst bed. In order not to expose the catalyst to higher temperatures than required, and consequently to accelerate deactivation of the catalyst, the required volume of catalyst is divided into a number of beds with cooling zones (quench sections) installed between the beds. The cooling is achieved by introduction of cold hydrogen gas through the "quench pipe". Besides the cooling, the quench zone must achieve spatial uniformity of species/temperatures of the liquid phase leaving the section to the lover bed. For this purpose a mixing chamber is installed in the section.

After the cooling and mixing stage the fluid must be distributed evenly on the catalyst of the bed below. For this purpose distribution trays are installed below the mixing chamber and above the catalyst of the lower bed. In order to achieve the highest distribution quality it must be assured that the distributor trays operates within own sensitivity limits. Distributor trays can operate as required as long as liquid depth on the tray is no more than 10 mm different from end to end of the tray Therefore, flow parameters of the fluid exiting the mixing chamber are often changed by different means and brought to the values required for the best performance of the distributor tray.

As it can be seen from the descriptions above the current organisation of the quench section consists from: quench pipe, mixing chamber, splash plate, rough cut tray (optional) and distributor tray. In some approaches the catalyst support grid, holding the catalyst of the higher bed, as well as the catalyst grid support beams are considered as a part of the quench section.

These elements are occupying lot of reactor space by own volume as well as free inter-element volume required to provide access to each of the elements for purpose of installation, un-installation, maintenance and cleaning of the elements.

The height of the quench section is the distance from the catalyst of lower bed to the catalyst of the bed above. The volume occupied by quench section is "inactive" reactor volume and decreasing this volume is paramount if increase of the active reactor volume is to be achieved. The space saved by decrease of the quench section height can be used for loading of the additional catalyst (revamp) or reduction of total reactor height (new reactors).

Known art mixers propose a solution to the problem of effective mixing and space requirements for the mixer. U.S. Pat. No. 8,017,095 discloses means to provide mixing of gas and fluids in a height constrained interbed space of a catalytic reactor without increasing pressure drop. In particular, the device improves the effectiveness of an existing mixing volume in mixing the gas phase and liquid phase of two-phase systems. According to U.S. Pat. No. 8,017,095, the mixing device helps create a highly arcuate flow to incoming effluents and a high degree of mixing within a constrained interbed space of a catalytic reactor.

Due to the installation, un-installation and maintenance requirements as well as for cleaning of all elements of the quench section it is crucial to provide enough space for full access to any of the elements. In order to minimise complexity of the work in the reactor it is necessary to enable convenient and fast opening/closing of all man-ways of all of the elements of the section.

Therefore a need exists to provide an improved efficient mixer which occupies less reactor space, especially vertically, than known mixers and which mixes effectively with a limited pressure drop.

SUMMARY OF THE INVENTION

The present invention provides high efficiency of the quench section in terms of cooling, mixing and redistribution and which occupy minimal reactor volume while fullfilling all other, earlier listed, requirements related to the installation, maintenance and cleaning. It would find application in many existing and new reactor units.

The new mixer design of the invention is a mixing device mounted between two catalyst beds in a multi-bed catalytic reactor with a cylindrical shape. The mixing device has a circular outer rim which corresponds to the inner wall of the reactor, the outer rim of the mixing device can either be an integrated part of the reactor wall such that the reactor wall provides the outer wall of the mixer or it can be a wall independent of the reactor connected to the reactor or placed adjacent to the inner side of the reactor wall. The mixing device comprises; collecting means disposed in a collecting section for collecting fluid from an up-stream catalytic bed, mixing means disposed in a mixing section for mixing the collected fluid and discharging means disposed in a discharging section for discharging the mixed fluid to a downstream catalytic bed. Particularly, the collecting section, the mixing section and the discharging section are disposed outside the center of the circular cross-section of the reactor. In this way the center of the mixer is free space which can be used for service and maintenance of the reactor internals and the mixer itself and a large area and distance for effective mixing is even though ensured since the largest area and circumferential distance of the cross section of the reactor is the area outside the center of the cross sectional area (circle) of the reactor and thus the mixer.

In an embodiment of the invention the mixing device has a donut shape and the collecting section, the mixing section and the discharging section are disposed in the outer part, the donut ring whereas the center part as in the above embodiment is free space. More particularly, the collecting section, the mixing section and the discharging section are disposed outside the center one third of the circular cross-sectional area of the reactor, preferably outside the center half of the circular cross-sectional area of the reactor. Accordingly a large area and a large distance is disposed for the mixer relative to its height, but also a large free center space is ensured for service and maintenance.

Horizontal 3 Level Mixing.

In a first aspect of the above described invention, the mixing device is constructed so the collecting means, the mixing means and the discharging means comprise channels comprising circular arc divider walls horizontally dividing one section from another section or dividing one section from the center of the circular cross-section of the reactor. This first aspect of the invention thus performs horizontal 3 level mixing. The mixer main body is donut shaped and is divided by the circular arc divider walls, which substantially forms a spiral (spiralling inwards) which divides the mixer to three connected sections:

Collection, mixing and discharging section. The gas and liquid effluent from the catalyst bed above the mixer is collected at the top of the mixer and directed to the collection channel placed at the maximum reactor/mixer diameter. The collected liquid and gas are directed toward an opening which connect the collection and mixing chamber. After the gas and liquid enter the mixing channel, they travel/rotate in the mixer in a circular arc movement before entering the discharge channel. The liquid and gas are discharged from the mixer through the opening designed for this purpose. Discharge direction for gas and liquid phase is toward the reactor center. The uniform pressure profile above the distributor tray achieved by controlled flow pattern of the gas and liquid leaving the mixer contributes to the uniform liveliness of the liquid on the distributor tray what for consequence have uniform gas and liquid distribution to the catalyst in the bed below the tray.

In an embodiment of this first aspect of the invention, the collecting means of the mixing device has one inlet for collecting the fluid from the up-stream catalytic bed. And in a further embodiment the mixing device further comprises a quench inlet for adding a quench fluid to the collected fluid, said quench inlet is disposed in the collecting section. In an embodiment, the quench inlet may be a gas tube which is located about 180° from the opening of the collection channel. The quench gas tube may be inserted into the collection channel and for instance cold hydrogen gas can be introduced directly to the mixer. A quench ring is not required.

In a further embodiment of this first aspect of the invention, the collecting section is disposed in an outer generally circular cross sectional area of the reactor relative to the mixing section and the mixing section is disposed in an outer generally circular cross sectional area of the reactor relative to the discharging section. As above the active area of the mixer, collecting, mixing and discharge is placed in the outer part of the circular area where the circumferential distance is the greatest, ensuring a long flow path so efficient mixing and even discharge is possible even with a low pressure loss and at the same time leaving the center part of the mixer free for inspection and service activities which all is a main object and advantage of the invention.

Vertical 3-Level Mixing.

In a second aspect of the above described invention, the mixing device is constructed so the collecting section is disposed in an up-stream axial level of the reactor relative to the discharging section. This second aspect of the invention thus performs vertical 3-level mixing, though each section may not be specifically in separate levels since the borders between each level may be a gradual transition. In an embodiment of this second aspect of the invention, the mixer is donut shaped and is divided by a spiral (spiralling downwards) to three connected sections: 1) Collection, 2) mixing and 3) discharging section. The gas and liquid effluent from the catalyst bed above the mixer is collected on the top of the mixer and directed to the collection channel placed at the maximum reactor diameter. The mixture of the liquid, process gas and possibly cold quench hydrogen gas are directed to the mixing channel through at least one opening. The gas and liquid mixture travel together through the mixing channel for, in one embodiment 180°, and then enter the discharge channel which is on a level below the mixing channel. The gas and liquid continue to travel through the discharge channel but are gradually released from the mixer through the slots designed for this purpose. The discharged gas enters the level below the mixer as a plug flow and the liquid can be released in two ways: 1) Toward the center of the reactor or 2) Toward the reactor walls from openings at the maximum mixer radius.

The uniform pressure profile above the distributor tray achieved by controlled flow pattern of the gas and liquid leaving the mixer contributes to the uniform liveliness of the liquid on a distributor tray below the mixer which for consequence has uniform gas and liquid distribution to the catalyst in the bed below the tray.

In a particular embodiment of the invention the collecting section, the mixing section and the discharging section each is disposed in at least a 120° sector of the generally circular cross sectional area of the reactor. The at least 120° ensures that each of the three processes are performed effectively in a long path. The three paths are not necessarily of equal length, particularly the mixing section may advantageously be disposed in more than a 120° sector to secure effective mixing with a small amount of pressure loss and the discharge section may advantageously be disposed in about 360° to ensure even discharge of the fluid in the entire circle of the mixer.

The fluid of the reactor and the mixer may comprise both gas phase, liquid phase and vapor phase. In an embodiment of the invention, even mixing is further improved by constructing the mixer so the discharging means comprise an inner circular arc divider wall providing a spilling brim for a liquid phase of the fluid. This has the effect that both the gas phase and the liquid phase are distributed evenly along the entire circle of the mixer and the entire cross sectional area of the reactor. In another embodiment of the invention there may instead be an outer spilling brim or as in a further embodiment of the invention both an inner and an outer spilling brim for even distribution of the liquid phase of the fluid.

To optimise the construction of the reactor and the one or more mixers within, the one or more mixing devices may form an integrated part of a catalyst bed support of the reactor. This has the advantage that the building-height of the entire construction may be reduced as compared to separate constructions of mixer and supports. Also the material cost of the construction may be reduced.

Accordingly in an embodiment of the invention the mixing device has a height of less than 1 m, preferably less than 0,5 m with respect to the axial direction of the reactor.

In a third aspect of the invention a predominantly cylindrical catalytic reactor (predominantly understood as most of the outline part of the reactor) has an upper catalyst bed superimposed on a lower catalyst bed and is provided with at least one mixing device according to any of the above described embodiments of the invention.

A fourth aspect of the invention is a method of mixing a fluid flowing inside a catalytic reactor between an upper catalyst bed and a lower catalyst bed of the reactor. In a first step of the process the cross sectional area of the flow of fluid from the upper catalyst bed is constricted to a collecting section disposed in a cross sectional area of the reactor in the radially outer third of a 120°-360° sector of the generally circular cross sectional area of the reactor to collect the fluid. This is done by preventing the fluid to flow down in the center of the cross sectional area, for instance by a plate placed in the center of the cross sectional area.

The collected fluid is then guided by the mixing device to flow in a tangential direction in the outer part of the circular mixer, in the mixing section. In a further embodiment of the invention the fluid may be guided to flow in two tangential directions and the fluid may start to flow in one or two tangential directions from one inlet of the mixer or from a plurality of inlets of the mixer.

The fluid is flowing in a circular movement in the mixing section and while doing so the fluid is mixed to become a homogenous fluid with respect to content, vapor, temperature and velocity. Efficient mixing is achieved because the fluid is flowing in the outer part of the circular cross section of the mixer where the mixing distance, the circumference, is the longest. There is no mixing in the center part of the mixing device i.e. disposed outside the center of the circular cross-section of the reactor, this is left open as free space.

After the fluid has been mixed, it flows further on to the discharge section of the mixing device, where it is discharged to the lower catalyst bed while at least a part of it is flowing in at least one tangential direction. Also the discharging section is disposed outside the center of the circular cross-section of the reactor, whereby also the discharging can be performed homogenous as a plug flow since it is performed over a long circumferential distance.

While the discharge flow of the fluid moves tangentially in a circular movement it is also moving either radially inwards, radially outwards or both radially inwards and outwards while flowing from the discharge section towards the catalyst bed underneath. The discharge section may include at least one spilling brim which forms an edge over which a liquid phase may flow/spill, forming droplets which blend with the gas phase discharging from the mixing device and forming a plug flow. The spilling brim helps ensuring a homogenous discharge of the liquid phase from the mixing device.

In the above described method of mixing fluid flowing inside a catalytic reactor, the fluid may comprise a gas phase and a liquid phase and possibly a vapor phase.

In an embodiment of the method of mixing fluid flowing inside a catalytic reactor, the fluid moves in an axially downwards direction relative to the reactor when flowing from the collecting section to the discharging section. Hence, the fluid performs a spiral movement downwards when flowing from the collecting section, to the mixing section and further to the discharging section.

In another embodiment of a method of mixing fluid flowing inside a catalytic reactor, the fluid moves in a radially inwards direction relative to the reactor when flowing from the collecting section to the discharging section. Hence, the fluid performs a spiral movement circular inwards when flowing from the collecting section, to the mixing section and further to the discharging section.

In yet a further embodiment of the described method, the fluid may flow in a combination of the two described movements, i.e. in a spirally movement circular inwards and downwards when flowing from the collecting, to the mixing and further to the discharging section of the mixing device.

BRIEF DESCRIPTION OF THE DRAWINGS

The invention is further illustrated by the accompanying drawings showing examples of embodiments of the invention.

DETAILED DESCRIPTION OF THE PREFERRED EMBODIMENTS

Two aspects and a number of embodiments of the invention will be explained in more detail in the following with reference to the drawings.

Figure 1:
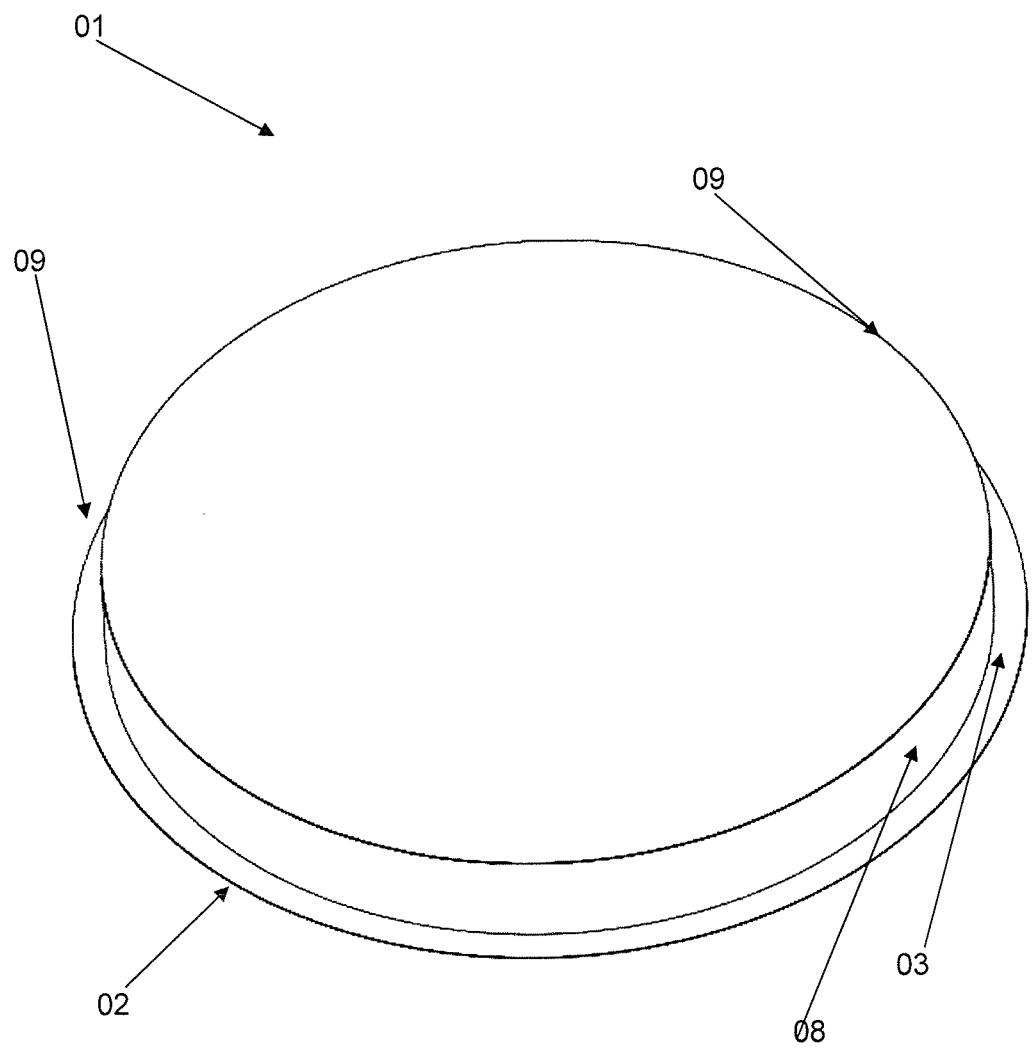
FIG. 1 shows an isometric top view of the mixing device according to an embodiment of a first aspect of the invention.

The isometric view of a first aspect, the horizontal 3-level mixing, of the invention presented in FIG. 1 shows a top view of the mixing device 01. The mixing device has a circular shape to correspond the inner circular wall of the cylindrical reactor (not shown) wherein the mixing device is to be installed. In particular, the outer rim 02 of the mixing device is circular. In this embodiment the mixing device has no outer wall, but as the outer rim matches the inner wall of the reactor, the reactor wall forms the outer wall of the mixing device. The minor gap between the outer rim and the reactor wall may be sealed, for instance by welding. The collection section 03 is formed between the outer wall which in this embodiment as mentioned is the inner reactor wall and a circular arc divider wall 08. The collection section is formed around the full 360° of the circular mixing device and on the largest diameter. Here the fluid flowing from the catalyst bed above (not shown) is collected as it enters through the inlet 09 which is formed by the top edge of the mixing device. The fluid can only flow to the next underlying catalyst bed via the inlet and further to the collecting section as the rest of the cross sectional area is blocked, in this embodiment by a plate. In an embodiment of the invention, a quench inlet (not shown) may be placed in the collecting section for adding cooling quench fluid to the fluid stream.

Figure 2:
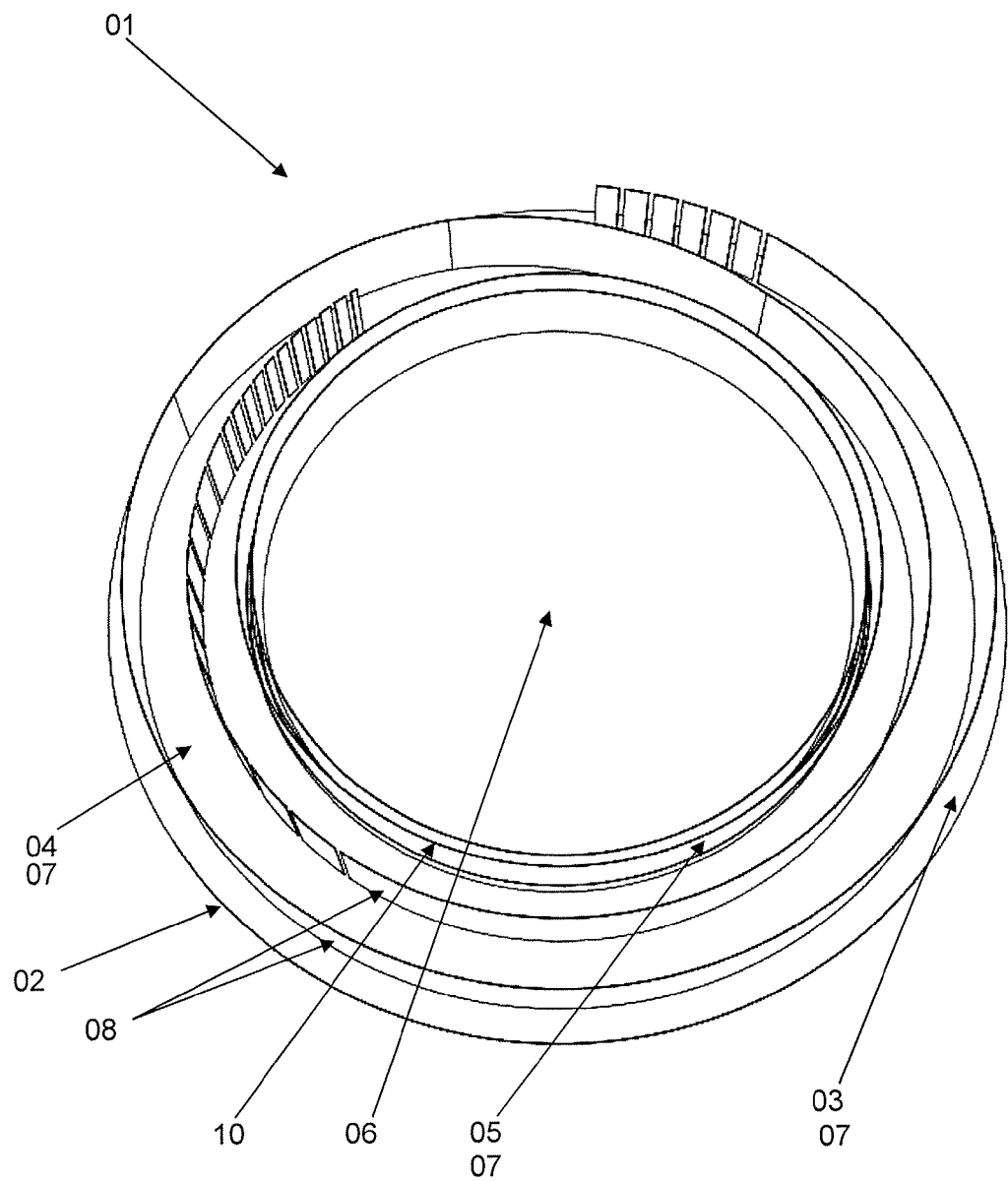
FIG. 2 shows an isometric top view of the inner parts of the mixing device according to an embodiment of the first aspect of the invention.

FIG. 2 shows the internals of the mixing device according to the first aspect of the invention, the horizontal 3-level mixing. More of the circular arc divider walls can be seen, and it is visible that they run substantially in a spirally inwards direction. Inside the collecting section, the mixing section 04 is formed in the same horizontal level but within the outer circular collecting section. The fluid flows from the collecting section to the mixing section via an opening in the spiral formed by the circular arc divider walls. As shown also slots in the circular arc divider wall may form additional passages from the collecting section to the mixing section. Mixing of the gas and maybe liquid and vapor takes place in the mixing channel as it travels for ca. 360° in almost the maximum diameter of the mixing device before entering the discharging section 05 partly through the opening in the spiral formed by the circular arc divider wall and partly through slot openings in the wall. In the discharging section the mixed gas and possibly liquid and vapor leaves the mixer in a uniform flow. A spilling brim 10 withholds an even level of liquid in the discharging section and through the vapor lift principles; the gas is lifting droplets of the liquid and carry it out of the collecting section towards the open space center part (which is also the center of the circular cross-section of the reactor 06) of the mixing device and further towards the catalyst bed below (not shown). The discharging section may also be constructed to allow for discharge of fluid towards the outer diameter of the mixing device (not shown). To further even out the distribution of the fluid to the catalyst bed below, distribution trays as known in the art (not shown) may be installed below the mixing device, above the downstream catalyst bed. As can be seen in FIG. 2, the circular arc divider walls form channels 07 which are forming the collecting, mixing and discharge sections.

Figure 3:
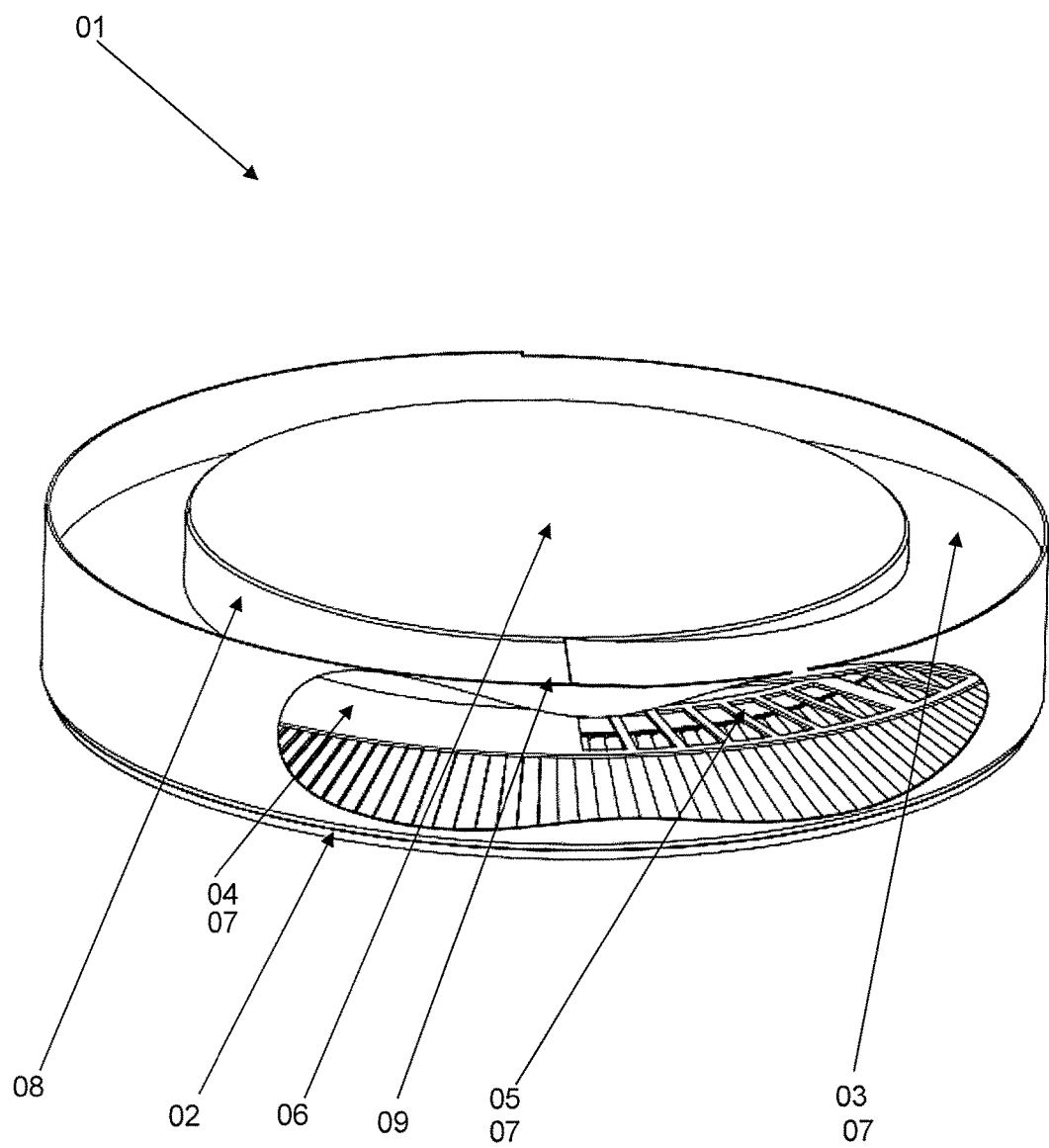
FIG. 3 shows an isometric top view of the mixing device according to an embodiment of a second aspect of the invention.

In FIG. 3, a second aspect of the invention, the vertical 3-level mixing is shown. In the embodiment shown, a circular arc divider wall is provided on the maximum diameter of the mixing device to form the outer wall of the channels. Hence, in this embodiment, the inner part of the reactor is not forming the outer wall of the mixing device even though the diameter of the circular outer rim of the mixing device corresponds to the diameter of the inner wall of the reactor. The mixing device is donut shaped and is divided by a spiral, spiralling downwards, to the three connected sections, the collecting section, the mixing section and the discharge section, all of which are formed on the maximum diameter of the mixing device and hence the reactor. The gas and possibly liquid and vapor from the catalyst bed above the mixing device is collected above the mixing device and directed to the collecting section which is formed as a circular arc channel by the circular arc divider walls. A quench inlet (not shown) may be placed in the collecting section. The fluid mixture is directed to the mixing section through a single opening at the end of the collecting section.

Figure 4:
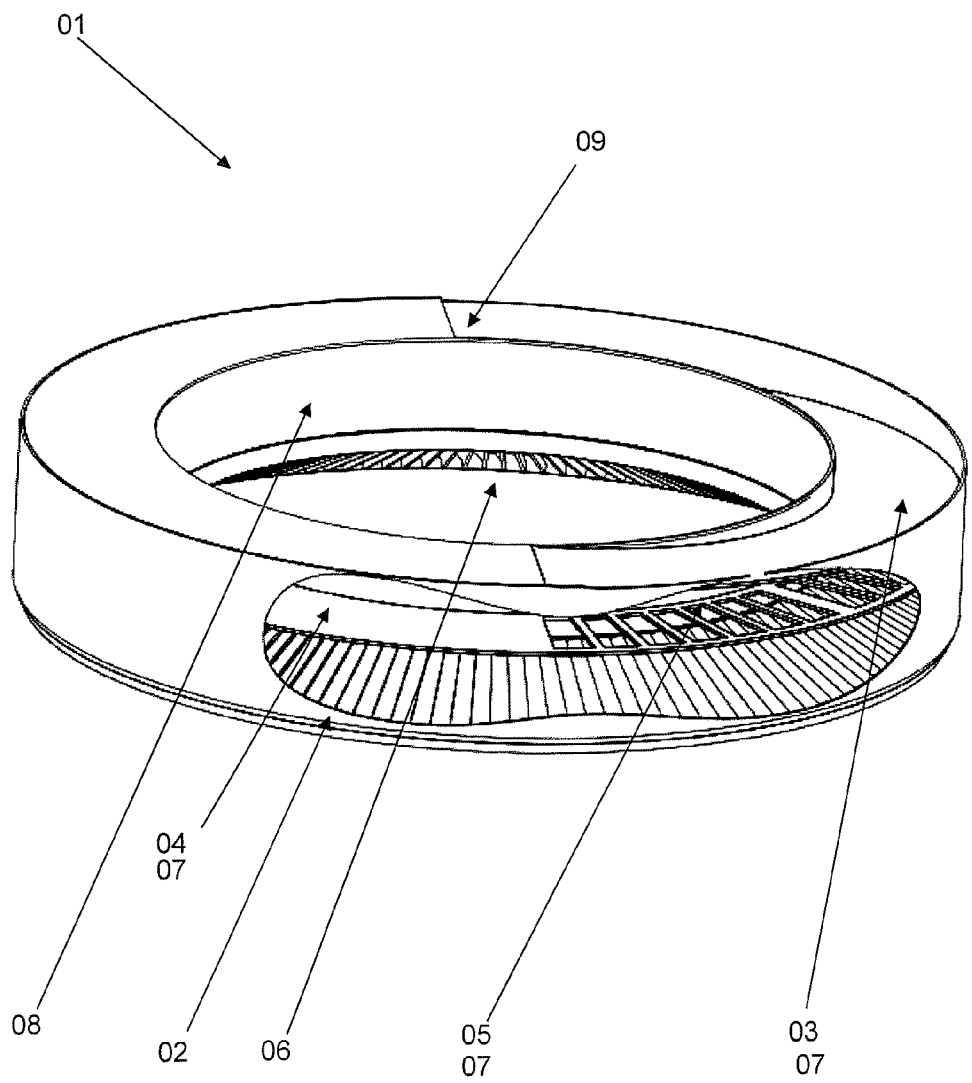
FIG. 4 shows an isometric top view of the inner parts of the mixing device according to an embodiment of the second aspect of the invention.

As can be better seen in FIG. 4, the fluid travels in the mixing section in a 180° circular movement, where the gas and possibly, quench fluid, liquid and vapor is mixed, before it enters the discharge section which is a level below the mixing section. The gas and possibly liquid continue to travel through the discharging section, but are gradually released from the mixing device towards the center of the mixing device/reactor. A spilling brim ensures an even liquid level in the full circle of the discharging section, and the gas drags liquid droplets over the spilling brim when discharging from the mixing device as described above. Also a discharge towards the outer diameter of the mixing device (not shown) is possible.

Figure 5:
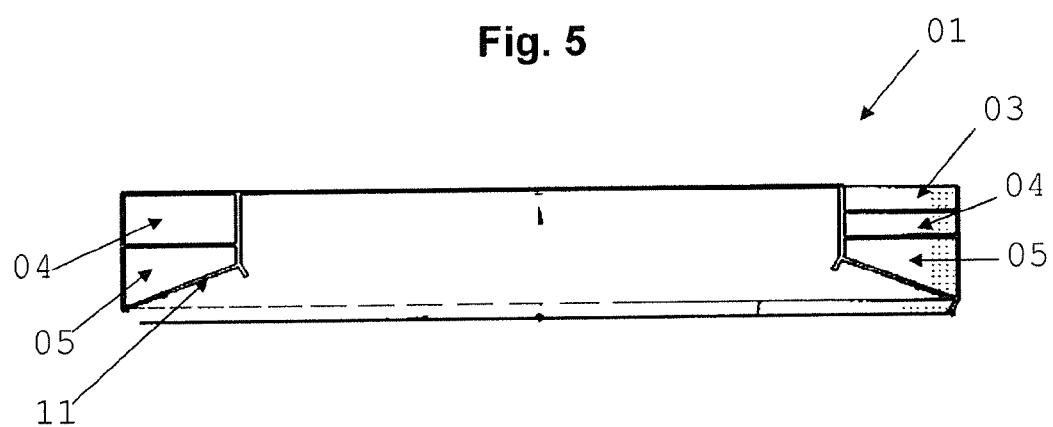
FIG. 5 shows a diametric cut view of an embodiment of the mixing device of the second aspect of the invention.
Figure 6:
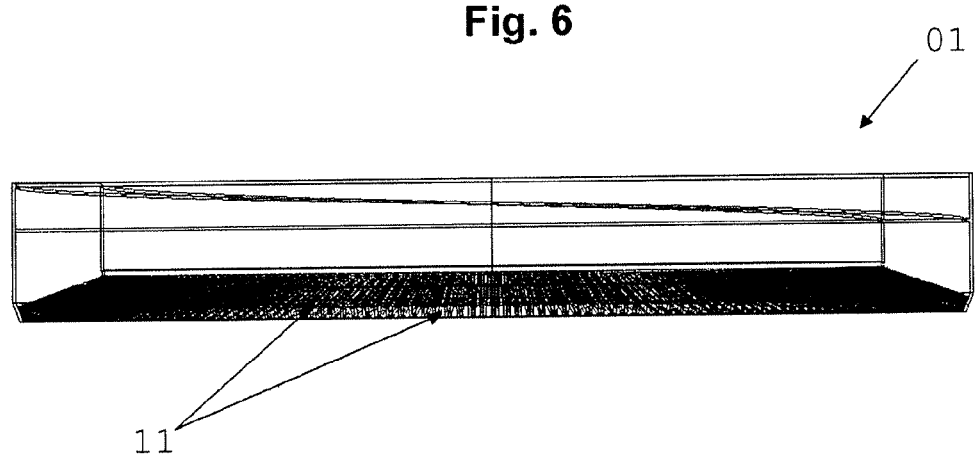
FIG. 6 shows a view of the discharging section according to an embodiment of the mixing device of the second aspect of the invention.
Figure 7:
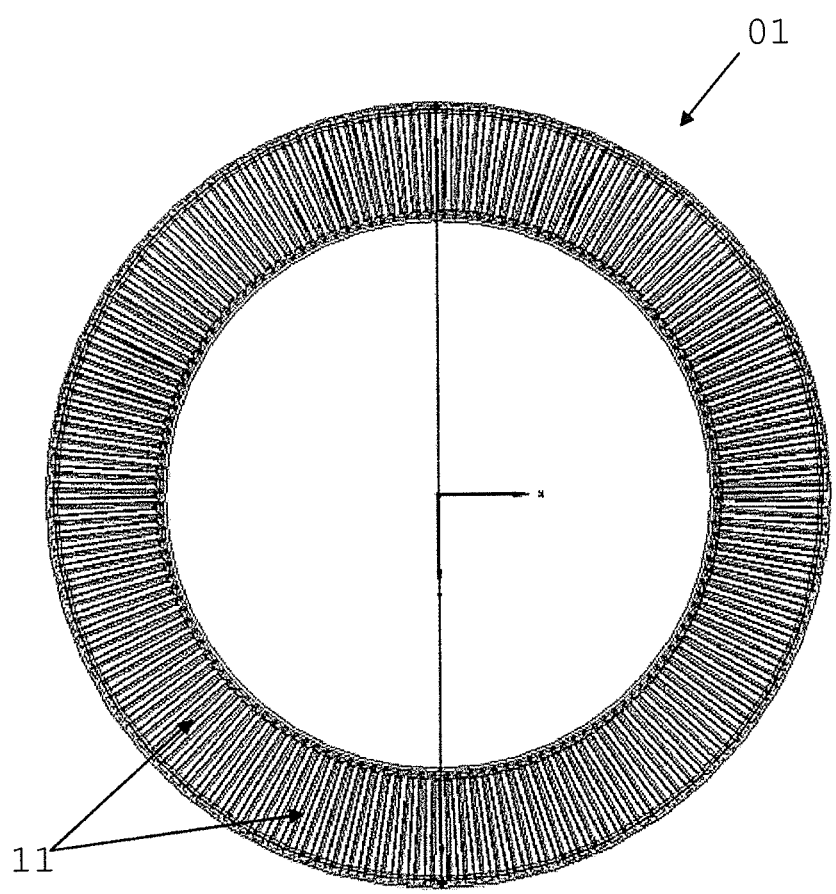
FIG. 7 shows a bottom view of the discharging section according to an embodiment of the mixing device of the second aspect of the invention.
Figure 8:
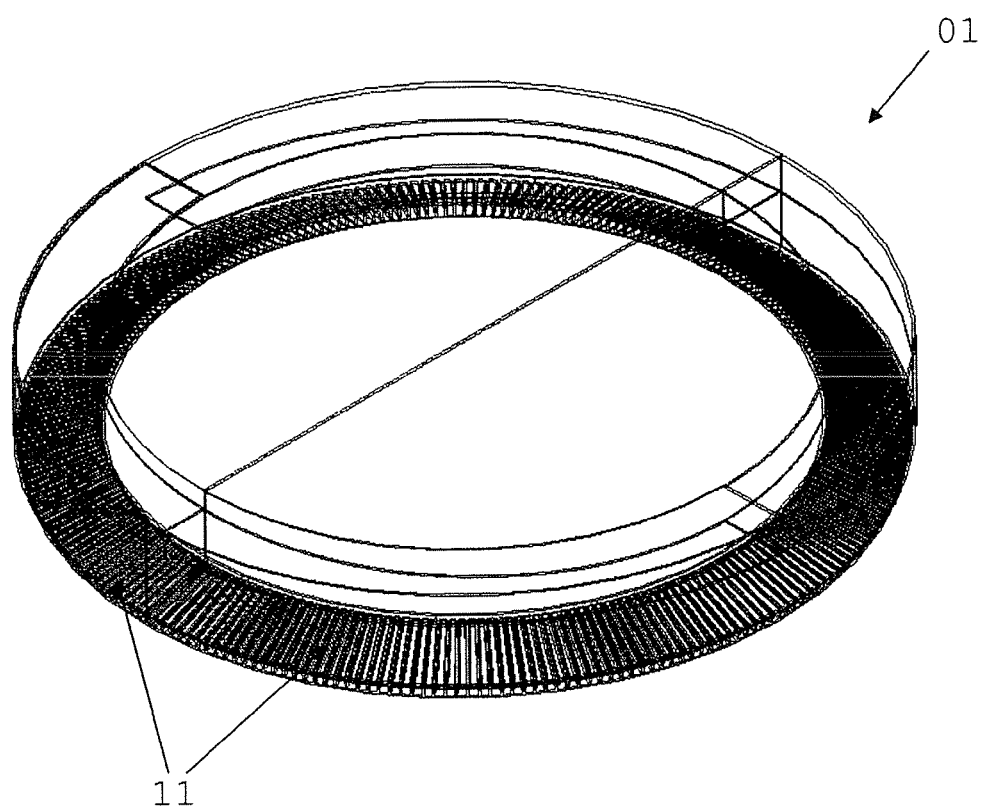
FIG. 8 shows a diametric view of the discharging section according to an embodiment of the mixing device of the second aspect of the invention.

In a further embodiment of the second aspect of the invention, the vertical 3-level mixing the discharging section has a construction so the mixed fluid discharges not towards the center of the mixing device, but downwards. As in the embodiment described above with reference to FIG. 4, this in this embodiment the mixed fluid travels in the mixing section in a 180° circular movement, before it enters the discharge section which is a level below the mixing section as can be seen on FIG. 5. The gas and possibly liquid continue to travel through the discharging section, but are gradually released from the mixing device downwards from the bottom part of the discharging section, guided by the discharge guide vanes 11 more clearly shown in FIGS. 6, 7, 8 and 10. In this embodiment the guide vanes also contribute to the mechanical strength and stiffness of the mixing device.

Figure 9:
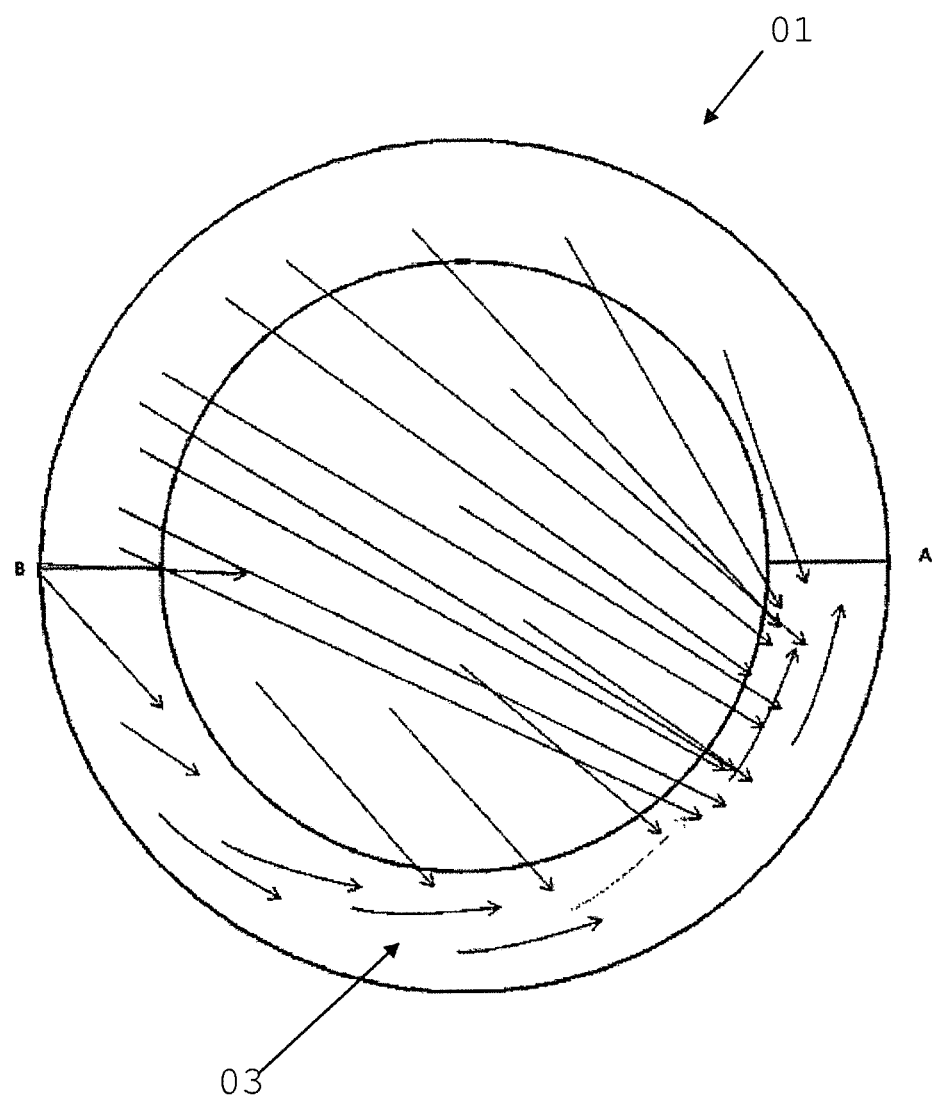
FIG. 9 shows a top flow-principle view according to an embodiment of the mixing device of the second aspect of the invention.
Figure 10:
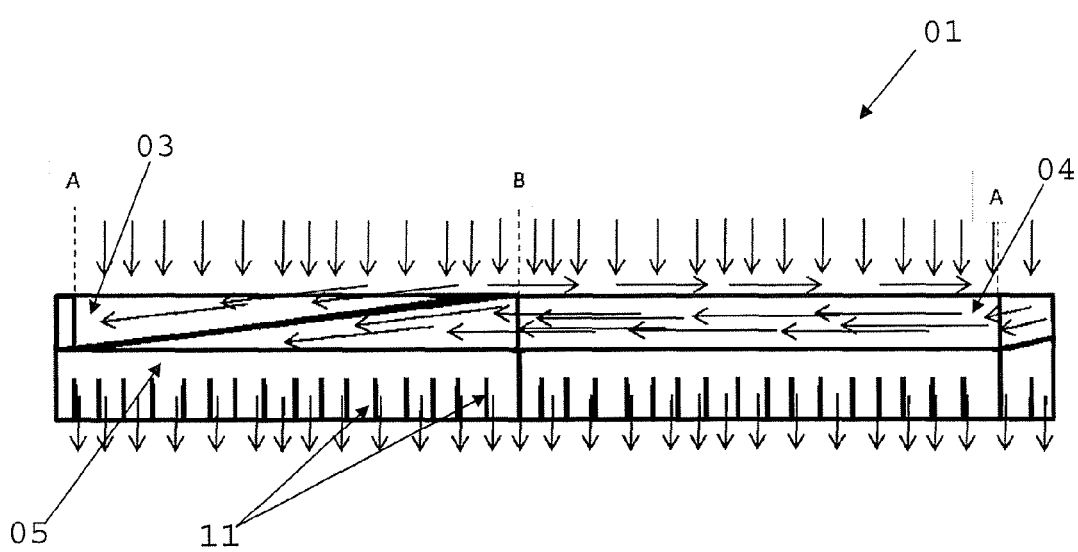
FIG. 10 shows a diametric cut flow-principle view of an embodiment of the mixing device of the second aspect of the invention.

In FIG. 9 the principle of the fluid flow above the mixing device is shown. From the reactor part above the mixer the fluid is forced out towards the collecting section as the center of the mixing device is blocked and is directed towards the mixing section. The fluids passing point A shown, and entering the mixing section are accelerated to a level optimal for multiphase mixing due to the decreased flow area. Leaving the mixing section at point B, the fluids are introduced to the discharging section. Due to the increase of cross-sectional area available for fluid flow as seen at point B, FIG. 10 from this point the fluid velocity decrease. The fluids are discharged from the mixing device gradually as they are circling around the discharging section. The discharge is done between the discharge guide vanes at the bottom of the discharging section.

What is claimed is:

1. A multi-bed catalytic reactor with a cylindrical shape comprising:
    a mixing device mounted between two catalyst beds in said reactor, said mixing device has a circular outer rim which corresponds to the inner wall of the reactor, the mixing device comprising:
        annularly shaped inlet means for receiving flow from a first catalyst bed and configured to convert axial flow from said reactor to circumferential and axially inclined flow,
        collecting means disposed in a collecting section for collecting fluid from said inlet means,
        mixing means disposed in a mixing section for mixing the collected fluid, and discharging means disposed in a discharging section for discharging the mixed fluid to a down-stream catalytic bed;
        wherein the mixing device has a donut shape and the collecting section, the mixing section and the discharging section are disposed outside the center of the circular cross-section of the reactor.

2. The multi-bed catalytic reactor according to claim 1, wherein the outer rim of said mixing device is an integrated part of the reactor wall.

3. The multi-bed catalytic reactor according to claim 1, wherein the collecting section, the mixing section and the discharging section are disposed at the outer one-third of the circular cross-sectional area of the reactor.

4. The multi-bed catalytic reactor according to claim 1, wherein the collecting means, the mixing means and the discharging means comprise channels comprising circular arc divider walls horizontally dividing one section from another section or dividing one section from the center of the circular cross-section of the reactor.

5. The multi-bed catalytic reactor according to claim 1, wherein the collecting means has one inlet for collecting the fluid from the up-stream catalytic bed.

6. The multi-bed catalytic reactor according to claim 1, wherein the mixing device further comprises a quench inlet for adding a quench fluid to the collected fluid, said quench inlet is disposed in the collecting section.

7. The multi-bed catalytic reactor according to claim 1, wherein the collecting section is disposed in an upstream axial level of the reactor relative to the discharging section.

8. The multi-bed catalytic reactor according to claim 1, wherein the collecting section is disposed in an outer generally circular cross sectional area of the reactor relative to the mixing section, and the mixing section is disposed in an outer generally circular cross sectional area of the reactor relative to the discharging section.

9. The multi-bed catalytic reactor according to claim 1, wherein the collecting section, the mixing section and the discharging section each is disposed in at least a 120° sector of the generally circular cross sectional area of the reactor.

10. The multi-bed catalytic reactor according to claim 1, wherein the discharging means comprise radial discharge guide vanes providing a vertical downward outlet of the fluid from the mixing device.

11. The multi-bed catalytic reactor according to claim 1, wherein the mixing device forms an integrated part of a catalyst bed support of the reactor.

12. The multi-bed catalytic reactor according to claim 1, wherein the mixing device has a height of less than 0.5 m with respect to the axial direction of the reactor.

13. A multi-bed catalytic reactor with a cylindrical shape comprising:
a mixing device mounted between two catalyst beds in said reactor, said mixing device has a circular outer rim which corresponds to the inner wall of the reactor, the mixing device comprising:
collecting means disposed in a collecting section for collecting fluid from an up-stream catalytic bed;
mixing means disposed in a mixing section for mixing the collected fluid, and
discharging means disposed in a discharging section for discharging the mixed fluid to a down-stream catalytic bed, said discharging means further comprise an inner circular arc divider walls providing a spilling brim for a liquid phase of the fluid;
wherein the mixing device has a donut shape and the collecting section, the mixing section and the discharging section are disposed outside the center of the circular cross-section of the reactor.

* * * * *